(12) United States Patent
Haack et al.

(10) Patent No.: US 12,384,513 B2
(45) Date of Patent: Aug. 12, 2025

(54) INTEGRAL DOOR FRAME UNIT

(71) Applicant: Premium Aerotec GmbH, Augsburg (DE)

(72) Inventors: Cord Haack, Augsburg (DE); Carsten Paul, Augsburg (DE); Bernhard Hörger, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 0 days.

(21) Appl. No.: 18/602,239

(22) Filed: Mar. 12, 2024

(65) Prior Publication Data

US 2024/0308639 A1    Sep. 19, 2024

(30) Foreign Application Priority Data

Mar. 14, 2023  (DE) .................. 10 2023 106 389.8

(51) Int. Cl.
*B64C 1/14*  (2006.01)

(52) U.S. Cl.
CPC ................ *B64C 1/1461* (2013.01)

(58) Field of Classification Search
CPC .. B64C 1/12; B64C 1/068; B64C 1/14; B64C 1/1461; B64C 1/1407; B64C 1/1423
See application file for complete search history.

(56) References Cited

U.S. PATENT DOCUMENTS

| | | | | |
|---|---|---|---|---|
| 2,797,884 A | * | 7/1957 | Peed, Jr. ............... | B64C 1/1407 |
| | | | | 244/129.5 |
| 2009/0146008 A1 | * | 6/2009 | Thiele ..................... | B64C 1/068 |
| | | | | 244/119 |
| 2017/0129586 A1 | * | 5/2017 | Elbracht ................... | B64C 1/12 |
| 2019/0135405 A1 | * | 5/2019 | Jörn ......................... | B64C 1/12 |

FOREIGN PATENT DOCUMENTS

| | | | | |
|---|---|---|---|---|
| DE | 102010014265 B4 | * | 1/2013 | ........... B64C 1/1461 |
| EP | 2944562 A2 | * | 11/2015 | ........... B64C 1/1423 |

* cited by examiner

*Primary Examiner* — Joshua J Michener
*Assistant Examiner* — Cindi M Curry
(74) *Attorney, Agent, or Firm* — Lerner David LLP

(57) ABSTRACT

A door frame unit for integration into a fuselage of an air vehicle includes at least one door frame component, wherein the door frame unit includes an inner frame and an outer frame surrounding the inner frame, wherein the inner frame defines a door frame opening with horizontal edges and vertical edges, in which a door is mountable, wherein a plurality of cross struts extend between the inner frame and the outer frame and are rigidly connected to the inner frame and the outer frame, and wherein the outer frame runs at an angle to the cross struts at least at areas directly neighboring corners of the inner door frame.

14 Claims, 3 Drawing Sheets

INTEGRAL DOOR FRAME UNIT

FIELD OF THE INVENTION

The present description relates to a door frame unit for integration into a fuselage of an air vehicle, a door arrangement in an air vehicle and an air vehicle with such a door arrangement and/or such a door frame unit.

BACKGROUND OF THE INVENTION

Conventional design principles of an aircraft fuselage and an aircraft door for commercial aircraft prevent the transfer of forces from the aircraft fuselage into the structure of the aircraft door. The aircraft door is designed to absorb compressive forces resulting from a differential pressure between the interior of the aircraft fuselage and the environment and to guide these forces into the aircraft fuselage via a door frame or the like. An area surrounding a door cut-out in the aircraft fuselage is therefore mechanically adapted and designed to absorb both fuselage forces and the forces originating from the aircraft door. In particular, forces running in a fuselage skin can be high there in order to stabilize the door cut-out. A door frame is usually provided for this purpose, which comprises a plurality of individual parts, for example frame, lintel, intercostal, sill, doublers and the like. This is associated with a comparatively high weight and a complex, time-consuming production process.

For example, DE 10 2018 127 106 B3 discloses an aircraft door locking system that is used to lock an aircraft door that can be moved relative to a door frame. The frame is shown there as a box profile with several cross struts of equal length, which are connected to a fuselage skin.

BRIEF SUMMARY OF THE INVENTION

It can be regarded as a task to propose an alternative door frame or an alternative door arrangement which is associated with simplified manufacture and/or lower weight.

A door frame unit for integration into a fuselage of an air vehicle is proposed, having at least one door frame component, wherein the door frame unit has an inner frame and an outer frame surrounding the inner frame, wherein the inner frame defines a door frame opening with horizontal edges and vertical edges, in which a door is mountable, wherein a plurality of cross struts run between the inner frame and the outer frame and are rigidly connected to the inner frame and the outer frame, and wherein the outer frame runs at an angle to the cross struts at least in areas directly neighboring corners of the inner door frame.

The door frame unit is intended for arrangement on a fuselage skin of an air vehicle in the area of a door opening. It provides a frame structure that supports conventional doors that only bear internal pressure and can create separate load paths for transferring forces from the door to the fuselage structure. The door frame unit consists of at least one door frame component which forms the shape described below.

According to the invention, the door frame unit is designed such that an inner door frame and an outer door frame are provided, wherein the outer frame surrounds the inner door frame, i.e. runs around it and, in particular, runs completely around it. The inner door frame is provided to hold the door and to absorb the forces acting on the door in a closed state. For this purpose, the inner door frame can have door pins that can be positively connected to the door.

The inner door frame has a door frame opening that is essentially rectangular and comprises two horizontal edges and two vertical edges. The corners could be rounded. The door frame opening is dimensioned in such a way that a door can be movably mounted in it.

The outer door frame extends over a larger area than the inner door frame and is not directly associated with the door frame opening. It surrounds the inner door frame and is rigidly connected to it via the plurality of cross struts. The cross struts guide forces originating from a door arranged in the inner frame directly into the outer frame and from there into the structure of the fuselage. The cross struts could, for example, extend parallel to a longitudinal axis of the aircraft in which the door frame unit is arranged. This means in particular that the cross struts could, for example, run parallel to an upper edge or a lower edge of the inner door frame. However, a different arrangement is also not excluded.

It is preferable that the inner frame and the outer frame have a cross-sectional profile that provides a sufficient area moment of inertia to absorb loads and guide them into the structure. At least the outer frame could preferably extend over a closed, continuous, tangent-continuous or kink-free line.

The fact that the inner frame is surrounded by an outer frame and the two frames are rigidly connected to each other means that force can be distributed over a large area in the fuselage structure. If the outer frame runs at an angle to the cross struts locally, this significantly increases the strength and can lead to a reduction in the amount of doubling required on the fuselage skin. The locally angular course can be achieved by a particularly favourable shape of the outer frame, for example a round shape. The door cut-out required for the integration of the door frame unit can be enlarged at least in the vertical direction in order to realise rounded corners of the door cut-out with significantly larger corner radii compared to the state of the art. The force curve on the door cut-out is therefore particularly even and there are no particularly pronounced load peaks.

The door frame unit can consist of just a few door frame components that are manufactured separately. A plurality of components that previously had to be manufactured individually, joined and then installed in a fuselage skin that has been doubled several times are no longer necessary. In addition to the fuselage skin, the door frame unit according to the invention only requires an optional doubling attached to the fuselage skin, on which the door frame unit is arranged. The door frame unit according to the invention is designed in such a way that a fail-safe production of independent load paths between individual door pins and the fuselage skin or the fuselage structure is possible. Furthermore, force-bearing doors can also be used. This makes it possible to use the door frame unit according to the invention in existing aircraft or aircraft types without having to change the type of doors.

The special feature of the door frame unit according to the invention is its constructive shape and the position of its essential structural features in relation to each other, which are designed in such a way that the flow of force can be guided around a door cut-out in the aircraft fuselage in a targeted manner. Taking the following explanations into account, it also becomes clear that the variety of parts and thus manufacturing costs can be reduced. In particular, weight can be saved if the at least one door frame component has a particularly high degree of integral construction. As already indicated above, the door could also be integrated as a force-bearing element, whereby the fail-safe requirement is retained in the door frame realized by the door frame unit. The position of the door in the fuselage becomes more versatile and can be installed anywhere without significantly changing the thickness of the fuselage skin, which is currently not possible with conventional solutions.

In an advantageous embodiment, the outer frame is formed round, in particular circular, elliptical or oval. Round shapes can support a harmonical, largely load-peak-free guidance of forces around a door cut-out in the aircraft fuselage. Oval shapes could be suitable if the door cut-out has a height that exceeds the width of the door cut-out. In particular, an oval outer frame could be elliptical and arranged such that its major axis is vertical and its minor axis is horizontal.

In an advantageous embodiment, the outer frame has a larger width in a vertically central area of the door frame unit than in neighboring areas vertically facing further from the central area towards an upper side or a lower side. This can be achieved in particular if the outer frame is designed with a round or oval shape. The loads generated on the inner frame and transferred to the outer frame can be distributed over a larger area. Cross struts could be provided on an upper side and/or a lower side, which extend beyond the outer frame and could be provided for connection to a doubler.

In an advantageous embodiment, the cross struts extend at least partially from the inner frame to the outer frame and end there. This means that at least part of the inner frame is connected to radially outwardly adjoining cross struts, which run radially outwards from the inner frame and extend there to the outer frame. This supports the transfer of loads from the inner frame to the outer frame that run radially relative to the door cut-out and in the plane of the fuselage skin. In particular, if the local distance between the outer frame and the inner frame is larger, it may be sufficient to have the cross struts provided there end at the outer frame. If the local distance is relatively small, it may make sense to have the cross struts run over the outer frame in order to achieve a more extensive transfer of forces into the fuselage skin.

In an advantageous embodiment, at least one cross strut on an upper side of the door frame unit and/or on an lower side of the door frame unit has a larger length than a neighboring cross strut, which is spaced further vertically from the upper side or lower side, and extends beyond the outer frame in the transverse direction.

In an advantageous embodiment, the cross struts are formed parallel to each other. In particular, they are aligned parallel to a lower edge and an upper edge of a door cut-out and therefore preferably run parallel to a longitudinal axis of the fuselage. It is conceivable that the cross struts are spaced apart in a vertical direction, i.e. along the side edges of the door cut-out. The cross struts could therefore run transversely to ribs and parallel to stringers arranged on the inside of the fuselage skin. The parallel alignment can simplify production and at the same time define a primary load distribution direction.

In an advantageous embodiment, the door frame unit is made in several parts and has several interconnected door frame components. For example, the door frame unit could have two vertically running and horizontally adjacent arranged lateral door frame components. It is also conceivable that, alternatively and/or additionally, an upper and a lower door frame component are provided.

In an advantageous embodiment, the door frame unit has an upper part, a lower part and two side parts. Both the upper part and the lower part as well as the two side parts could be aligned and formed symmetrically to each other. By using four door frame components, integral production could be carried out by die casting, 3D printing or build-up welding, whereby the four door frame components can be easily transported and yet quickly assembled.

In an advantageous embodiment, several door pins are arranged on the inner frame to support the door and protrude into the door frame opening. At least some of the door pins are preferably designed redundantly, for example by arranging door pins in pairs at the relevant points. Each door pin then leads to an individual load path that is independent of the load path that is linked to the other door pin of the pair in question.

In an advantageous embodiment, the door frame unit further has a radius closure area at the upper side and lower side of the door frame unit, wherein the radius closure area is formed to cover an upper or lower part of the door cut-out up to the respective horizontal edge. The radius closure area therefore serves to reduce the door cut-out, which is enlarged in the vertical direction due to the increased corner radius, to a conventional size in order to adapt the resulting opening to the size of an aircraft door. The radius closure area could take the form of a combination of lower or upper cross struts and a skin that fits flush against a relevant local boundary edge of the door cut-out. If necessary, a sealing profile or a sealing compound is provided there.

The invention also relates to a door arrangement in an air vehicle, having a door frame unit according to the preceding description and at least one doubler for attachment to a fuselage skin of the air vehicle in the area of a door cut-out. The door cut-out is arranged in particular laterally on the fuselage of the air vehicle and could have rounded corners. The at least one doubler is to be understood as a sheet-like component which is connected to an inner side of the fuselage skin in order to achieve a local doubling of the fuselage skin to increase the thickness of the fuselage skin.

In an advantageous embodiment, the door frame unit is formed to carry loads arising during operation of the air vehicle independently of the fuselage skin of the air vehicle and to guide them around the door cut-out in the fuselage skin. Consequently, the fuselage skin in the area of the door cut-out is significantly relieved by Integration of the door frame unit according to the invention compared to conventional door frame arrangements.

In an advantageous embodiment, two doublers are provided, which are arranged on the fuselage skin on an upper side and a lower side of the door cut-out. In particular when using a round, especially circular, oval or elliptical outer frame, the local strength of the door frame unit could make it possible to dispense with a doubler fitted there, so that doublers could only be provided on the upper side and the lower side.

In an advantageous embodiment, the door frame unit is glued, welded or riveted to the fuselage skin. For metallic materials, riveting or welding is the best option, as these are tried and tested fastening methods. If the fuselage skin and the door frame unit are made of a thermoplastic material, such as PEEK or PEKK, welding in particular could be considered, although riveting and gluing are also conceivable in principle. Other fastening variants are also conceivable, which could depend on the material of the fuselage skin. For example, it is conceivable to consider co-consolidation for fuselage made of fibre composite materials based on a duromer matrix, in which a pre-cured door frame unit, for example, is placed on a pre-cured fuselage skin and then cured together with the fuselage skin.

In an advantageous embodiment, the door cut-out is larger than the door frame opening, at least in the vertical direction. The door frame unit can cover a vertically upper and/or lower part of the door cut-out and guide the load in this area around the door cut-out or transfer it to a doubler arranged there.

The invention further relates to an air vehicle, comprising at least one door frame unit according to the preceding description and/or at least one door arrangement according to the preceding description.

BRIEF DESCRIPTION OF THE DRAWINGS

In the following, embodiments are described in more detail with reference to the accompanying drawings. The illustrations are schematic and not to scale. Identical reference signs refer to identical or similar elements. The drawings show in.

DETAILED DESCRIPTION

Figure 1:
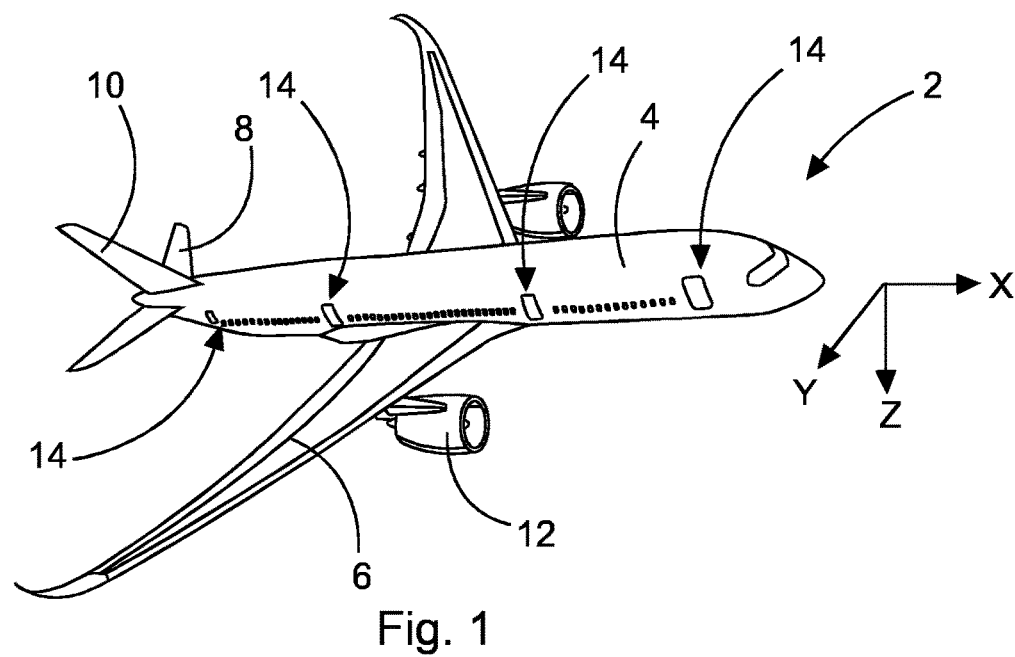
FIG. 1 a schematic representation of an aircraft with a door arrangement according to an embodiment example.

FIG. 1 shows an air vehicle 2 with a fuselage 4, wings 6, a horizontal stabilizer 8, a vertical stabilizer 10, engines 12 and several door arrangements 14 according to the invention, through which passengers and crew members can enter the fuselage 4 of the air vehicle 2. The structure of such a door arrangement 14 is illustrated in the following figures. To clarify the orientation of individual sections of the door arrangement 14, an aircraft fixed coordinate system is shown in FIG. 1, to which reference is made in places in the description.

Figure 2:
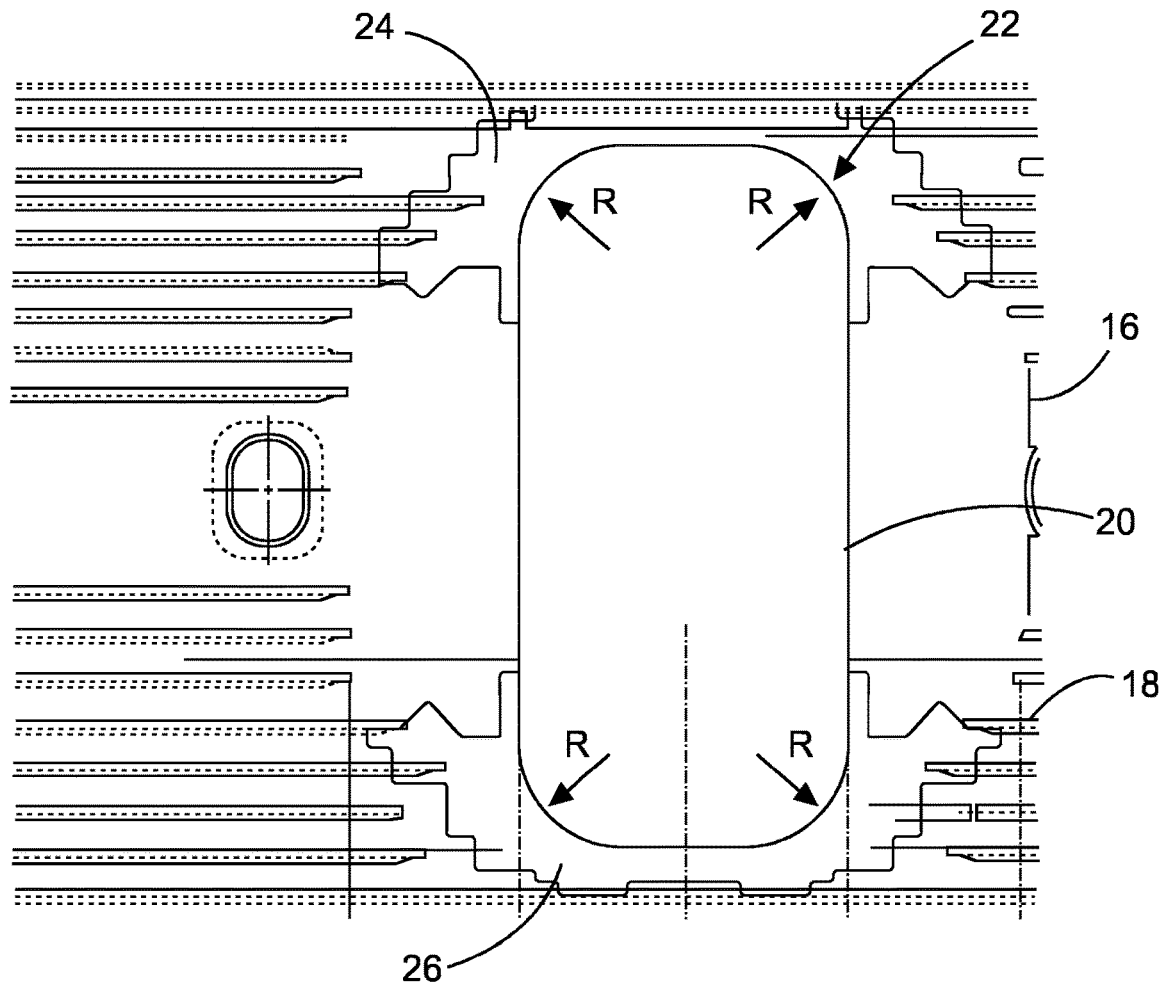
FIG. 2 a schematic representation of a door cut-out.

FIG. 2 shows a section of a fuselage skin 16 as seen from the inside of the fuselage 4. Several longitudinal stiffening elements 18 (stringers) are provided here, which run parallel to each other and parallel to the longitudinal axis x of the air vehicle 2. Furthermore, a door cut-out 20 is provided in the fuselage skin 16, which in an orthogonal projection comprises a rectangular surface with rounded corners 22. The door cut-out 20 is larger in the vertical direction, i.e. along the z-axis, than would be required for the integration of a door. The rounded corners 22 can be rounded in the shape of an arc of a circle and each have a corner radius R, the size of which significantly exceeds the usual corner radii of door cut-outs in air vehicle. A standard corner radius could be around 120 mm. The corner radius R of the door cut-out 20 could be increased to around 330 mm. Corner radii R in the range from 150 mm to 500 mm, preferably from 250 mm to 400 mm and particularly preferably from 300 mm to 350 mm are conceivable when manufacturing the door cut-out 20.

An upper doubler 24 is provided in an upper area of the door cut-out 20, which extends radially outwards from the door cut-out 20 onto the inside of the fuselage skin 16. The doubler 24 could be made of titanium, for example, and locally increases the thickness of the fuselage skin 16, thereby reinforcing it. A lower doubler 26 is arranged on the lower side of the door cut-out 20, which could be essentially symmetrical to the upper doubler 24 and locally reinforces the fuselage skin 16. It may be advisable to glue the doublers 24 and 26 to the fuselage skin 16, especially if a different material is used for the doublers 24 and 26 than for the fuselage skin 16.

Figure 3:
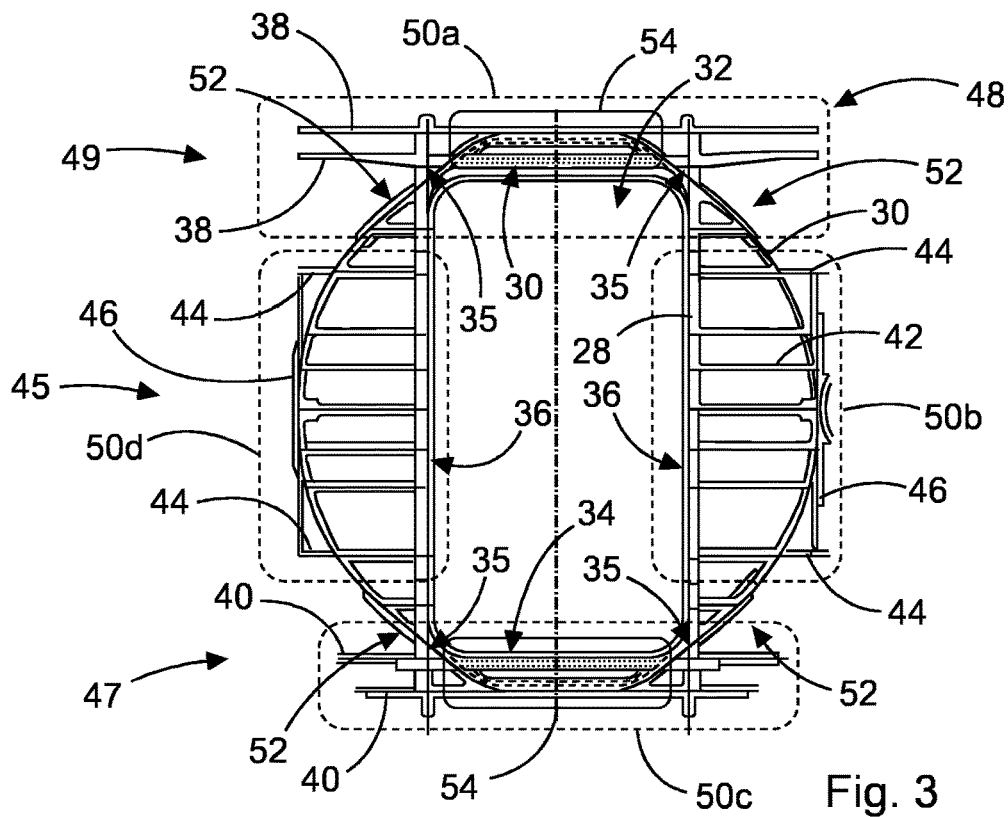
FIG. 3 a schematic representation of a door frame unit.

FIG. 3 now shows an inner frame 28 and an outer frame 30, with the inner frame 28 defining a door frame opening 32 and the outer frame 30 surrounding the inner frame 28. The outer frame 30 is round and approximately circular. In a vertically central area 45, the outer frame 30 therefore has a significantly larger width than in a lower area 47 and an upper area 49. The door frame opening 32 has horizontal edges 34, vertical edges 36 and intervening corners 35, wherein the inner frame substantially defines a rectangular surface in an orthogonal projection. The door frame opening 32 is smaller in the vertical direction than the door cut-out 20.

By way of example, two upper cross struts 38 are provided in the upper area 49 and two lower cross struts 40 are provided in the lower area 47, which run between the vertical edges 36 and extend radially outwards over the inner door frame 28. They thus cover the upper or lower part of the door cut-out 20 and the corner radii R present there. In the vertically central area 45, first central cross struts 42 are also provided, which extend from the inner door frame 28 to the outer door frame 30 and for the most part end there. On each side of the door cut-out 20, two elongated, second central cross struts 44 are also provided, which extend slightly outwards in a radial direction over the outer frame 30 and are interconnected by an additional, vertical frame part 46. This forms a door frame unit 48 which serves to accommodate an aircraft door.

As an example, four door frame components 50a, 50b, 50c and 50d can be used for this purpose, which are manufactured separately from one another and then assembled. The upper frame component 50a and the lower frame component 50c each form a radius closure area 54 at the corners 35. There, the vertically enlarged door cut-out 20 with the enlarged corner radius with the conventional corner radius, for example 120 mm, is reduced to a conventional dimension for Integration of a door 62. The advantages of the load distribution around the door cut-out 20 remain and a receiving space for the door in question is radially adapted to the size of the door.

Due to the round shape of the outer frame 30, lower and upper angular or diagonal areas 52 are also provided, which are not found in conventional door frames.

Figure 4:
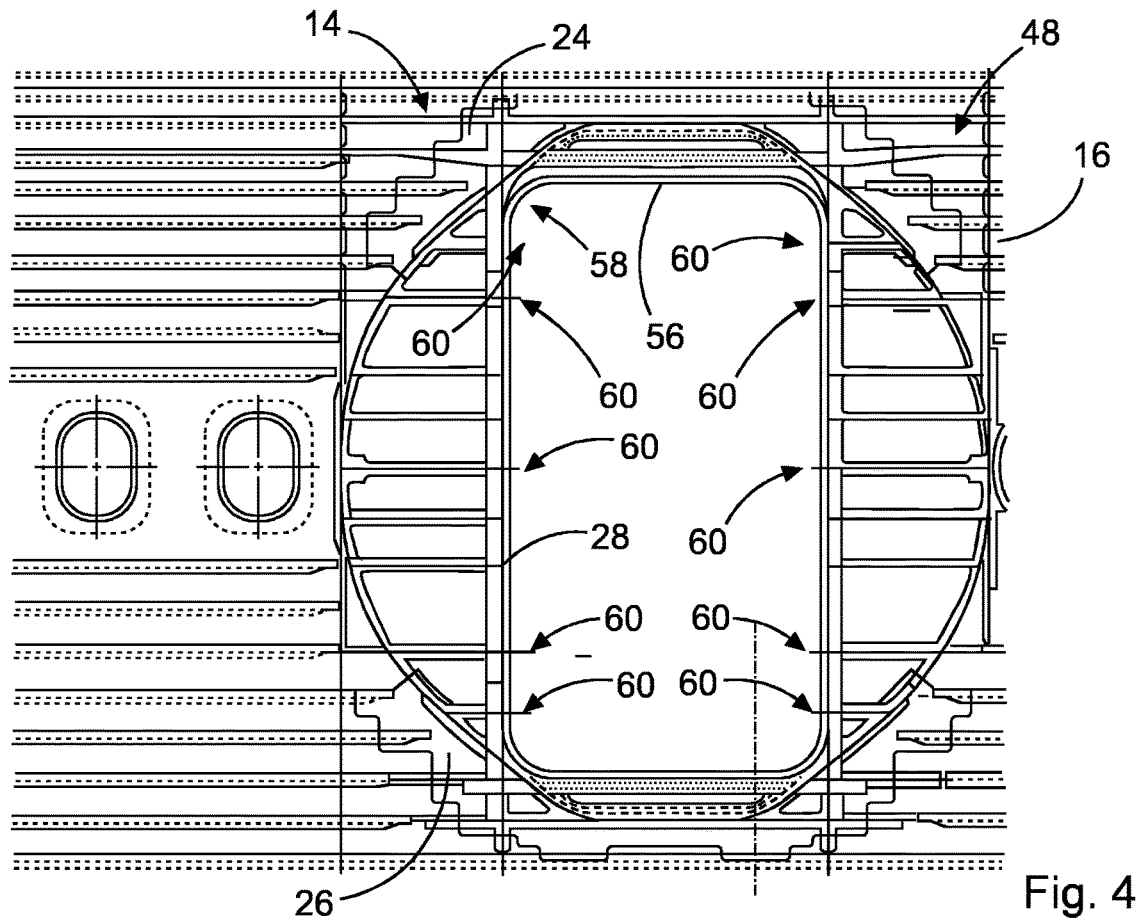
FIG. 4 a schematic representation of a door arrangement.

FIG. 4 shows the fuselage skin 16 with the door frame unit 48 arranged thereon, which thus forms the door arrangement 14. To compare the door frame unit 48 with a conventional door frame 56, the latter is indicated by dashed lines. It is clear that the conventional frame corners 58 have a significantly smaller corner radius than the door cut-out 20, as already explained above.

Door pins 60 are arranged in the inner frame 28, which are each designed in pairs and thus redundantly in an upper area and a lower area of the inner frame 28. In a vertically central area, on the other hand, a single door pin 60 is provided on each side. When an aircraft door suspended from the inner frame 28 is closed, the door pins 60 are positively connected to the aircraft door in order to absorb forces acting on the door and guide them via the door frame unit 48 into the fuselage 4. In addition to conventional doors, which are only loaded by an internal pressure from the inside of the fuselage 4, load-bearing doors can also be used, which can additionally absorb structural loads.

Figure 5:
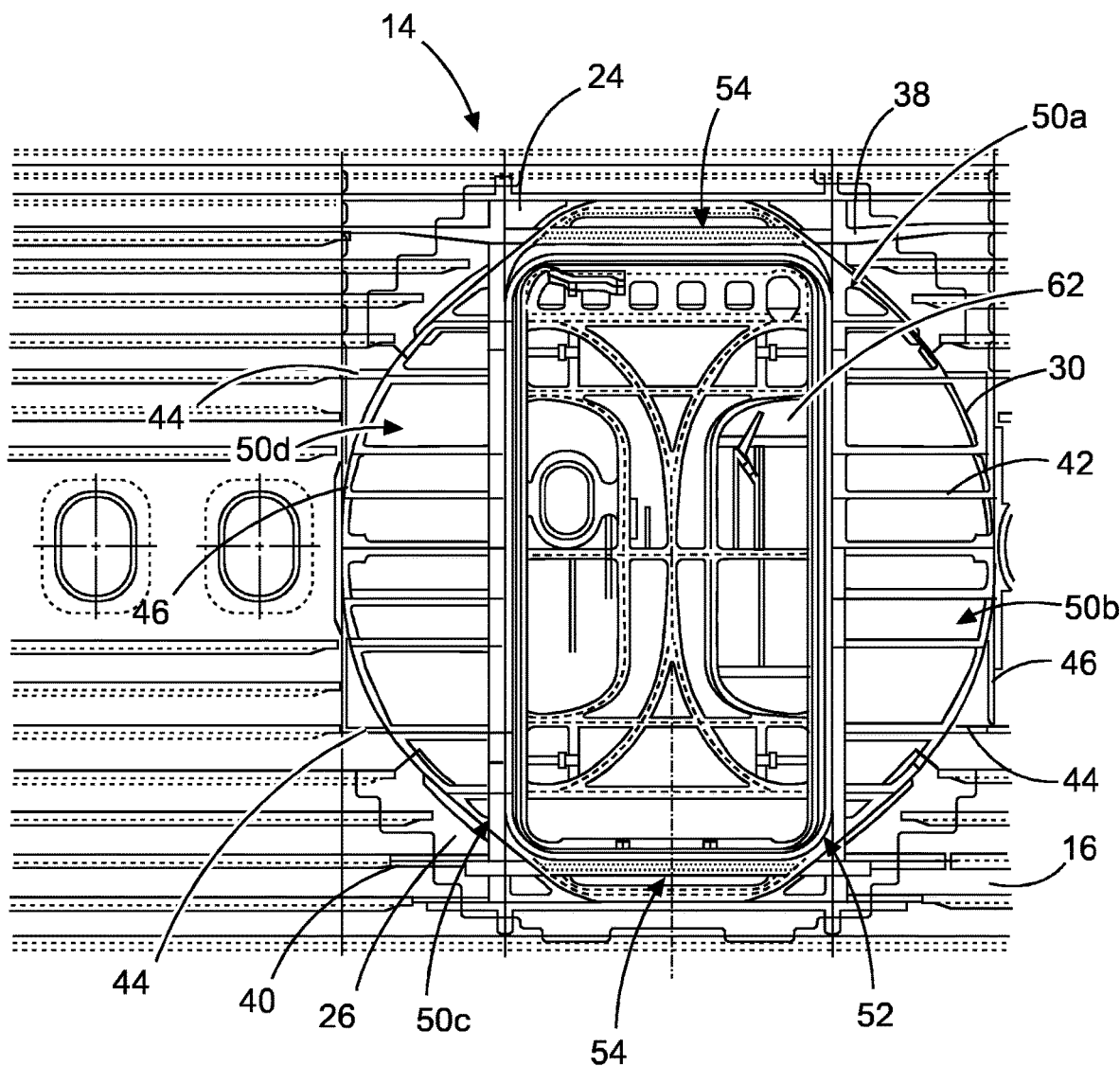
FIG. 5 a schematic representation of the door arrangement with the door located therein.

In FIG. 5, the door arrangement 14 is shown with a door 62 located therein, which is connected to the door pins 60.

In addition, it should be noted that "comprising" or "comprising" does not exclude other elements or steps and "a" or "one" does not exclude a plurality. It should also be noted that features or steps described with reference to one of the above embodiments may also be used in combination with other features or steps of other embodiments described above. Reference signs in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 air vehicle
4 fuselage
6 wing
8 horizontal stabilizer
10 vertical stabilizer
12 engine
14 door arrangement
16 fuselage skin
18 longitudinal stiffening element
20 door cut-out
22 corner
24 upper doubler
26 lower doubler
28 inner frame
30 outer frame
32 door frame opening
34 horizontal edge
35 corner
36 vertical edge
38 upper cross strut
40 lower cross strut
42 first central cross strut
44 second central cross strut
45 vertical centre section
46 vertical frame section
47 lower section
48 door frame unit
49 upper section
50 door frame component
52 lower diagonal section
54 radius closure area
56 standard door frame
58 common frame corner
60 door pin
62 door
R Corner radius

The invention claimed is:

1. A door frame unit for integration into a fuselage of an air vehicle, comprising at least one door frame component,
    wherein the door frame unit has an inner frame and an outer frame surrounding the inner frame,
    wherein the inner frame defines a door frame opening having horizontal edges and vertical edges in which a door is mountable,
    wherein a plurality of cross struts run between the inner frame and the outer frame and are rigidly connected to the inner frame and the outer frame,
    wherein the outer frame extends, at least in areas directly neighboring the corners of the inner door frame, at an angle to the cross struts, and
    wherein the outer frame is formed circular, elliptical or oval.

2. A door frame unit for integration into a fuselage of an air vehicle, comprising at least one door frame component,
    wherein the door frame unit has an inner frame and an outer frame surrounding the inner frame,
    wherein the inner frame defines a door frame opening having horizontal edges and vertical edges in which a door is mountable,
    wherein a plurality of cross struts run between the inner frame and the outer frame and are rigidly connected to the inner frame and the outer frame,
    wherein the outer frame extends, at least in areas directly neighboring the corners of the inner door frame, at an angle to the cross struts, and
    wherein the outer frame has a larger width in a vertically central area of the door frame unit than in an upper and a lower neighboring areas vertically facing from the central area.

3. The door frame unit according to claim 1,
    wherein the cross struts extend at least partially from the inner frame to the outer frame and end there.

4. The door frame unit according to claim 1,
    wherein at least one cross strut on an upper side of the door frame unit has a larger length than a neighboring cross strut, which is spaced further vertically from the upper side and extends in a transverse direction beyond the outer frame, or
    wherein at least one cross-unit on a lower side of the door frame unit has a larger length than neighboring cross strut, which is spaced further vertically from the lower side and extends in a transverse direction beyond the outer frame.

5. The door frame unit according to claim 1,
    wherein the cross struts are formed parallel to each other.

6. The door frame unit according to claim 1,
    wherein the door frame unit is configured in several parts and has several interconnected door frame components.

7. The door frame unit according to claim 6,
    wherein the several parts comprise an upper part, a lower part and two side parts.

8. The door frame unit according to claim 1, further comprising
    several door pins for supporting the door arranged at the inner frame and projecting into the door frame opening.

9. A door frame unit for integration into a fuselage of an air vehicle, comprising at least one door frame component,
    wherein the door frame unit has an inner frame and an outer frame surrounding the inner frame,
    wherein the inner frame defines a door frame opening having horizontal edges and vertical edges in which a door is mountable,
    wherein a plurality of cross struts run between the inner frame and the outer frame and are rigidly connected to the inner frame and the outer frame, and wherein the outer frame extends, at least in areas directly neighboring the corners of the inner door frame, at an angle to the cross struts, the door frame unit further comprising a radius closure area at the upper side and the lower side of the door frame unit, and wherein the radius closure area is formed to cover respectively an upper or a lower part of the door cut-out up to the respective horizontal edge.

10. The door arrangement for an air vehicle, comprising a door frame unit according to claim 1; and a doubler for attachment to a fuselage skin of the air vehicle in an area of a door cut-out.

11. The door arrangement according to claim 10, wherein the door frame unit is formed to support loads arising during operation of the air vehicle independently of the fuselage skin of the air vehicle and to guide them around the door cut-out in the fuselage skin.

12. The door arrangement according to claim 10, wherein the doubler comprises first and second doublers, arranged on an upper side and a lower side of the door cut-out on the fuselage skin.

13. The door arrangement according to claim 10, wherein the door cut-out at least in the vertical direction is larger than the door frame opening.

14. An air vehicle, comprising:
at least one door frame unit according to claim 1; and/or
at least one door arrangement comprising a door frame unit according to claim 1; and a doubler for attachment to a fuselage skin of the air vehicle in an area of a door cut-out.

\* \* \* \* \*